(12) United States Patent
Bye et al.

(10) Patent No.: US 10,444,017 B2
(45) Date of Patent: Oct. 15, 2019

(54) METHOD TO IMPROVE LEVELING PERFORMANCE IN NAVIGATION SYSTEMS

(75) Inventors: Charles T. Bye, Eden Prairie, MN (US); Fan Liu, Shawnee, KS (US); Kenneth Steven Morgan, St. Petersburg, FL (US)

(73) Assignee: Honeywell International Inc., Morris Plains, NJ (US)

( * ) Notice: Subject to any disclaimer, the term of this patent is extended or adjusted under 35 U.S.C. 154(b) by 2434 days.

(21) Appl. No.: 13/464,298

(22) Filed: May 4, 2012

(65) Prior Publication Data
US 2013/0103344 A1 Apr. 25, 2013

Related U.S. Application Data

(60) Provisional application No. 61/551,300, filed on Oct. 25, 2011.

(51) Int. Cl.
*G01C 21/16* (2006.01)

(52) U.S. Cl.
CPC .................... *G01C 21/16* (2013.01)

(58) Field of Classification Search
CPC ........................................... G06F 15/00
USPC ........................................... 702/150
See application file for complete search history.

(56) References Cited

U.S. PATENT DOCUMENTS

| 4,908,767 A | 3/1990 | Scholl et al. |
| 5,617,317 A | 4/1997 | Ignagni |
| 6,085,149 A | 7/2000 | Morgan et al. |
| 6,647,352 B1 * | 11/2003 | Horton ............ 702/151 |
| 7,248,964 B2 | 7/2007 | Bye |
| 7,587,277 B1 * | 9/2009 | Wells ............ 701/510 |

(Continued)

FOREIGN PATENT DOCUMENTS

WO 2006113391 10/2006

OTHER PUBLICATIONS

European Patent Office, "Communication Under Rule 71(3) EPC from EP Application No. 12188253.4 dated Jul. 11, 2014", "from Foreign Counterpart of U.S. Appl. No. 13/464,298", Jul. 11, 2014, pp. 1-7, Published in: EP.

(Continued)

*Primary Examiner* — Ricky Ngon
(74) *Attorney, Agent, or Firm* — Fogg & Powers LLC

(57) ABSTRACT

An attitude estimator system is provided. The attitude estimator system includes a navigation system, a Kalman filter, and a form observations module. The navigation system receives input from a first accelerometer and gyroscope, a second accelerometer and gyroscope, and a third accelerometer and gyroscope. The form observations module receives input from at least one high performance accelerometer and/or gyroscope; forms and outputs at least one of velocity-derived observations and attitude-derived observations. The Kalman filter processes by at least one of: inputting the velocity-derived observations formed in the form observations module, rotating the velocity-derived observation into a sensor-frame, and zeroing gains associated with at least one low performance accelerometer and/or gyroscope; or inputting the attitude-derived observations that are based on output from at least one of the first high performance accelerometer, the first high performance gyroscope, and the second high performance accelerometer.

10 Claims, 12 Drawing Sheets

(56) References Cited

U.S. PATENT DOCUMENTS 7,671,794 B2 3/2010 Pinto et al.
2007/0282529 A1* 12/2007 Thompson et al. .......... 701/220
2010/0256907 A1 10/2010 Bye

OTHER PUBLICATIONS

European Patent Office, "Office Action from EP Application No. 14181268.5 dated Jan. 30, 2015", "from Foreign Counterpart of U.S. Appl. No. 13/464,298", Jan. 30, 2015, pp. 1-5, Published in: EP.
European Patent Office, "European Search Report from EP Application No. 14181268.5 dated Jan. 16, 2015", "from Foreign Counterpart of U.S. Appl. No. 13/464,298", Jan. 16, 2015, pp. 1-3, Published in: EP.
European Patent Office, "European Search Report", "from Foreign Counterpart of U.S. Appl. No. 13/464,298", dated Feb. 13, 2013, pp. 1-3, Published in: EP.
European Patent Office, "Office Action", "from Foreign Counterpart of U.S. Appl. No. 13/464,298", dated Apr. 8, 2013, pp. 1-6, Published in: EP.
European Patent Office, "Communication Under Rule 71(3)", "from Foreign Counterpart of U.S. Appl. No. 13/464,298", dated Dec. 16, 2015, pp. 1-45, Published in: EP.

* cited by examiner

METHOD TO IMPROVE LEVELING PERFORMANCE IN NAVIGATION SYSTEMS

This application claims the benefit of U.S. Provisional Application No. 61/551,300, filed on Oct. 25, 2011, which is incorporated herein by reference in its entirety.

BACKGROUND

Some currently available attitude estimate systems or inertial navigation systems contain inertial sensors that include both high and low performance gyroscopes and high and low performance accelerometers in which the low performance gyroscopes and accelerometer sense axes are co-aligned parallel to the force of gravity, when in operation. In some cases, the low performance accelerometer is a micro-electro-mechanical system (MEMS) accelerometer. The heading estimate of such a device degrades when the low performance accelerometer is tilted so that the low performance sense axis is no longer optimally aligned parallel to the force of gravity. When this occurs, the sense axis of the low performance accelerometer begins to contribute to the computation of heading by the navigation algorithms and Kalman filter and the estimate of heading is degraded. Likewise, when the sense axis of the low performance gyroscopes are tilted to be non-parallel to the force of gravity or non-parallel to true north, the low performance gyroscopes begin to contribute to the computation of heading by the navigation algorithms and Kalman filter and the estimate of heading is degraded.

In some cases, the performance of the navigation algorithms and the Kalman filter is severely degraded when such a device is highly tilted or rotated from north. The performance degradation in heading is especially large when low performance MEMS accelerometers and gyroscopes are used in some axes.

SUMMARY

The present application relates to an attitude estimator system. The attitude estimator system includes a navigation system to output navigation data; a Kalman filter to output Kalman filter feedback to the navigation system; and a form observations module executable by a processor. The navigation system receives input from a first high performance accelerometer and a first high performance gyroscope aligned to a first sensor-frame-level axis, from a second high performance accelerometer and a second gyroscope aligned to a second sensor-frame-level axis, and from a third low performance accelerometer and a third low performance gyroscope aligned to a sensor-frame Z axis. The form observations module receives input from at least one of the first high performance accelerometer, the first high performance gyroscope, and the second high performance accelerometer. The form observations module forms at least one of velocity-derived observations and attitude-derived observations, and outputs the at least one of velocity-derived observations and attitude-derived observations to the Kalman filter. The Kalman filter processes the input from the form observations module by at least one of: inputting the velocity-derived observations formed in the form observations module, rotating the velocity-derived observation into a sensor-frame, and zeroing gains associated with at least one of the third low performance accelerometer, and the third low performance gyroscope; or inputting the attitude-derived observations formed in the form observations module, the attitude-derived observations being based on output from at least one of the first high performance accelerometer, the first high performance gyroscope, and the second high performance accelerometer.

DRAWINGS

In accordance with common practice, the various described features are not drawn to scale but are drawn to emphasize features relevant to the present invention. Like reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

It is desirable to use a low cost attitude estimator system that has a low performance accelerometer and a first low performance gyroscope aligned (when operational and level) to the vertical direction parallel to the force of gravity, g, and a second (low or high) performance gyroscope oriented parallel to north. It is to be understood that an attitude estimator system is an "inertial navigation system". The degrading effects resulting from tilting or rotating such an attitude estimator system are reduced or eliminated by the attitude estimator systems and methods described herein. Thus, the attitude estimator systems and methods described herein provide improved attitude accuracy, especially heading accuracy, in a navigation system.

Figure 1:
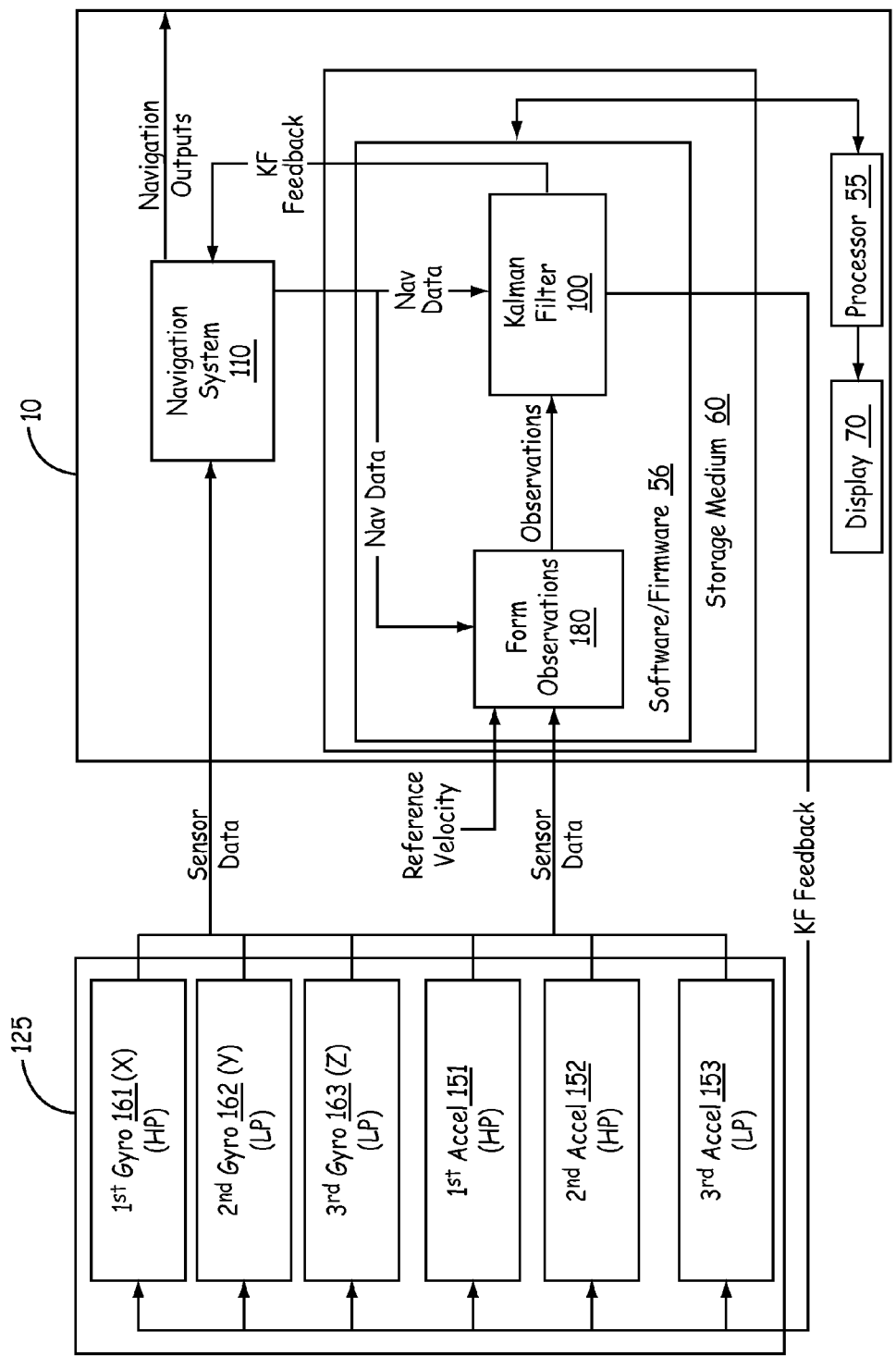
FIG. 1 is a block diagram of an embodiment of an attitude estimator system communicatively coupled to compensated sensors in accordance with the present invention.

FIG. 1 is a block diagram of an embodiment of an attitude estimator system 10 communicatively coupled to compensated sensors 125 in accordance with the present invention. The attitude estimator system 10 includes a navigation system 110, a processor 55, and non-transitory software/firmware 56 in a storage medium 60. The software/firmware 56 includes a Kalman filter 100 and a form observations module 180 in which observations are computed. The terms "form observations" and "compute observations" are used interchangeably, herein. The software/firmware 56 is executed by the processor 55. In one implementation of this embodiment, the processor 55 is part of the navigation system 110.

The compensated sensors 125 (referred to herein as "sensors 125") include a first accelerometer 151, a second accelerometer 152, and a third accelerometer 153, a first gyroscope 161, a second gyroscope 162, and a third gyroscope 163. As shown in FIG. 1, the first accelerometer 151 and the second accelerometer 152 are high performance (HP) accelerometers, while the third accelerometer 153 is a low performance (LP) accelerometer. The third low performance accelerometer 153 is typically lower cost than the high performance first accelerometer 151 and the high performance second accelerometer 152. In one implementation of this embodiment, the third accelerometer 153 is a MEMS accelerometer.

As shown in FIG. 1, the first gyroscope 161 is a high performance gyroscope 161, while the second gyroscope 162 and the third gyroscope 163 are low performance gyroscopes. The second low performance gyroscope 162 and the third low performance gyroscope 163 are typically lower cost than the first high performance gyroscope 161.

Figure 2:
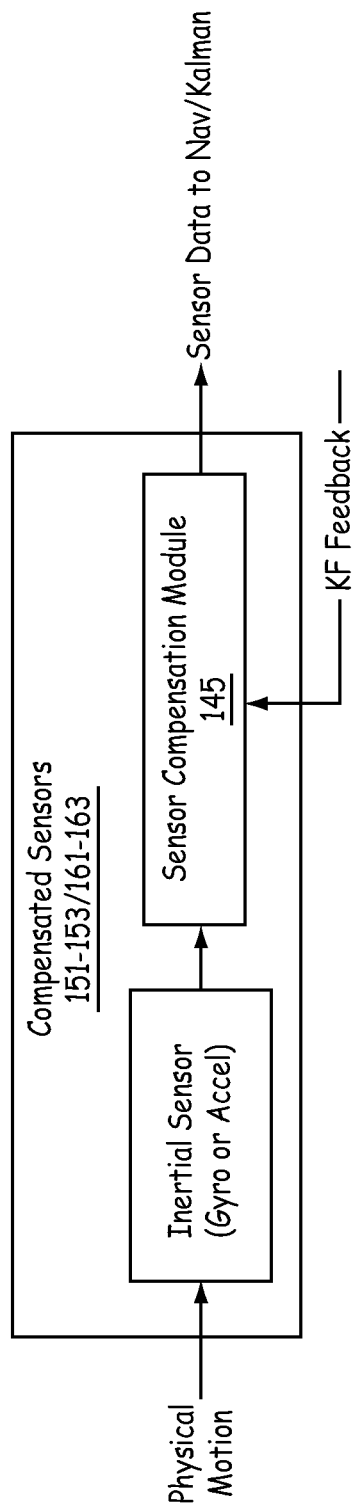
FIG. 2 is a block diagram of an embodiment of the compensated sensors of FIG. 1.

FIG. 2 is a block diagram of an embodiment of the compensated sensors 125 of FIG. 1. The data from inertial sensors (e.g., accelerometers 151-153 and/or gyroscopes 161-163) is output to a sensor compensation module 145. The sensor compensation module contains compensations that affect multiple axis sensors that are implemented to prevent the low performance sensor from degrading the performance of the high performance sensors. The sensor compensation module 145 also receives Kalman filter feedback from the Kalman filter 100. Based on input from the accelerometers 151-153, the gyroscopes 161-163, and the Kalman filter feedback, sensor compensation module 145 outputs compensated sensor data to the navigation system 110 and to the Kalman filter 100 via the form observations module 180. In one implementation of this embodiment, each of the accelerometers 151-153 and the gyroscopes 161-163 have an associated sensor compensation module 145 and each of the associated sensor compensation modules 145 output compensated sensor data to the navigation system 110 and the Kalman filter 100. Alternately, the sensor compensation module 145 may be located in the attitude estimator system 10.

Figure 3:
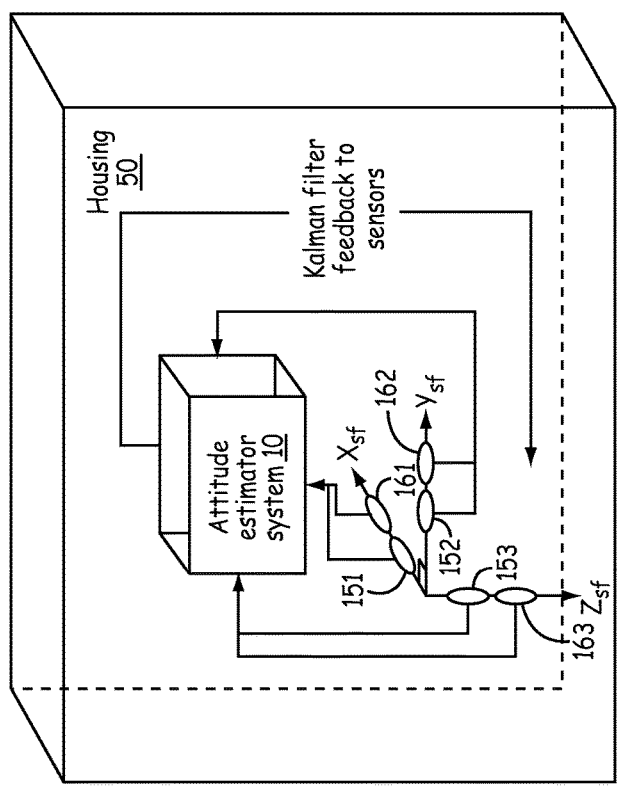
FIG. 3 is a block diagram of an embodiment of an attitude estimator system and sensors in a housing shown with reference to a local-level frame and north, east, down frame of the earth in accordance with the present invention.
Figure 3:
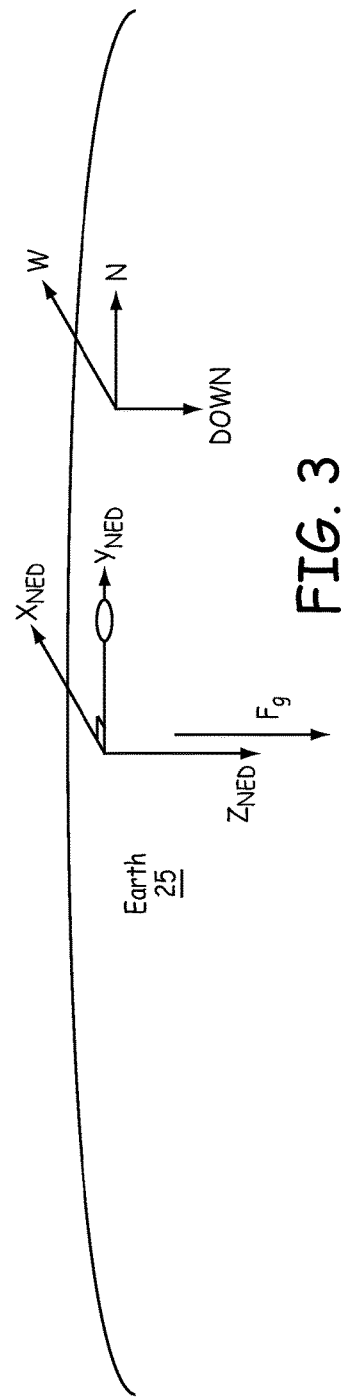

FIG. 3 is a block diagram of an embodiment of an attitude estimator system 10 and sensors 151-153 and 161-163 in a housing 50 shown with reference to the north, east, down (NED) frame $(X_{NED}, Y_{NED}, Z_{NED})$ of the earth 25 in accordance with the present invention. A local level frame is the NED frame that is rotated about Z (Down) by an angle called "wander angle" or "alpha." When alpha is zero, then the local level frame is equivalent to the NED frame. The local level frame or the "wander azimuth frame" is used to avoid the singularity that occurs in the NED frame when passing over the North Pole or South Pole. As shown in FIG. 3, the sensor-frame $(X_{sf}, Y_{sf}, Z_{sf})$ of the housing 50 is level, i.e., aligned with the north, east, down frame of the earth 25 as shown in FIG. 3. The alignment of the sensors 151-153 and 161-163 to the sensor-frame $(X_{sf}, Y_{sf}, Z_{sf})$ of the housing 50 is shown in FIG. 3. In one implementation of this embodiment, the housing 50 is inside a targeting system and the sensor-frame $(X_{sf}, Y_{sf}, Z_{sf})$ of the housing 50 is aligned to the targeting frame of the targeting system. In another implementation of this embodiment, the sensor-frame $(X_{sf}, Y_{sf}, Z_{sf})$ of the housing 50 is not aligned with the targeting frame of targeting system. The attitude estimator system 10 will operate even if the sensors 151-153 and 161-163 are not aligned with the north, east, down (NED) frame.

If the sense axes of the three accelerometers 151-153 are not orthogonally arranged, the sensed data is mathematically aligned to an orthogonal set of basis vectors. Likewise, if the sense axes of the three gyroscopes 161-163 are not orthogonally arranged, the sensed data is mathematically aligned to an orthogonal set of basis vectors in which at least one vector is aligned to the first sensor-frame axis $X_{sf}$. It is to be noted that the sensor-frame is an arbitrary frame where $X_{sf}$ is not necessarily aligned to the sense axis of any sensor.

The first or X accelerometer 151 is mathematically aligned to the first sensor-frame axis $(X_{sf})$. The sense axis of the X accelerometer 151 is usually physically collinear to within a few tenths of a degree with the first sensor-frame axis $X_{sf}$. The second or Y accelerometer 152 is mathematically aligned to the second sensor-frame axis $(Y_{sf})$. The sense axis of the Y accelerometer 152 is usually physically collinear to within a few tenths of a degree with the second sensor-frame axis $Y_{sf}$. The third or Z accelerometer is mathematically aligned to the third sensor-frame axis $(Z_{sf})$. The sense axis of the Z accelerometer 153 is usually physically collinear to within a few tenths of a degree with the third sensor-frame axis $Z_{sf}$.

The first or X gyroscope 161 is mathematically aligned to the first sensor-frame axis $(X_{sf})$. The sense axis of the X gyroscope 161 is physically collinear to with the first sensor-frame axis $X_{sf}$. The second or Y gyroscope 162 is mathematically aligned to a second sensor-frame axis $(Y_{sf})$. The sense axis of the Y gyroscope 162 is usually physically collinear to within a few tenths of a degree with the second sensor-frame axis $Y_{sf}$. The third or Z gyroscope 163 is mathematically aligned to a third sensor-frame axis $(Z_{sf})$. The sense axis of the Z gyroscope 163 is usually physically collinear to within a few tenths of a degree with the third sensor-frame axis $Z_{sf}$.

In one implementation of this embodiment, the first and second accelerometers 151 and 152 are level accelerometers and the first and second gyroscopes 161 and 162 are level gyroscopes, which are aligned to the first and second level axes of the north, east, down frame (e.g., $X_{NED}, Y_{NED}$,) when the housing 50 is level with the earth 25. In this case, the first sensor-frame axis $X_{sf}$ is also referred to herein as the first sensor-frame-level axis $X_{sf}$ and the second sensor frame axis $Y_{sf}$ is also referred to herein as the second sensor-frame-level axis $Y_{sf}$. In another implementation, other axes are the level axes.

Referring back to FIG. 1, the form observations module 180 (shown as form observations 180) inputs data from at least one of the high performance sensors and outputs observations to the Kalman filter 100. The specific observations depend on design of the Kalman filter 100. As defined herein, the term "observation" refers to an estimated error of a measured value compared to a reference value. It is to be understood that term "reference" as used herein is an adjective meaning "true" or correct". Thus, a reference value of any type is a true value (e.g., correct data). The reference value is either based on the fact that the unit is known to be stationary (in which case a reference velocity value is equal to zero), or is obtained from another sensor, such as GPS or a magnetometer. The "reference velocity value" is also referred to herein as "reference velocity".

A direction cosine rotation matrix describes the rotation between one coordinate system and another. Therefore, a reference attitude direction cosine matrix between the sensor-frame ($X_{sf}$, $Y_{sf}$, $Z_{sf}$) and the local-level frame ($X_{NED}$, $Y_{NED}$, $Z_{NED}$) is a correct direction cosine matrix for rotating information between the sensor-frame ($X_{sf}$, $Y_{sf}$, $Z_{sf}$) and the local-level frame ($X_{NED}$, $Y_{NED}$, $Z_{NED}$). The direction vectors, velocity vectors, acceleration vectors, and translation (movement) vectors determined by the sensor measurements are transformed between rotated reference frames with a 3 by 3 direction-cosine-matrix.

In one implementation of the attitude estimator system 10, the form observations module 180 of FIG. 1 forms attitude-derived observations. As defined herein, attitude-derived observations are formed based on attitude or based on measurements derived from attitude. Specifically, the attitude-derived observations are based on high-performance data output from at least one of the high performance sensors (i.e., the high performance accelerometer 151, the first high performance gyroscope 161, the second high performance accelerometer 152, and the second gyroscope if it is a high performance gyroscope 162). The form observations module 180 inputs data from high performance sensors, forms attitude-derived observations, and outputs an attitude observation to the Kalman filter 100. A reference attitude is differenced with a navigation attitude from the navigation system 110 to compute the attitude observation. This is referred to herein as "forming attitude-derived observations". The Kalman filter 100 processes the input from the form observations module 180 and updates the attitude estimate of the navigation system 100. This implementation reduces the degradation due to the low performance sensors (i.e., the third low performance accelerometer 153, the third low performance gyroscope 163, and the second gyroscope 162, if it is a low performance gyroscope 162).

In another implementation of the attitude estimator system 10, the form observations module 180 of FIG. 1 forms velocity-derived observations. As defined herein, velocity-derived observations are formed based on velocity or based on measurements derived from position or velocity. In one implementation of this embodiment, the form observations module 180 of FIG. 1 uses the fact that the attitude estimator system is stationary (i.e., the reference velocity value equals zero) and outputs a navigation frame (Nav frame) velocity observation to the Kalman filter 100. This is referred to herein as "forming velocity-derived observations". The Nav frame velocity measurements are in a frame of reference other than the sensor frame ($X_{sf}$, $Y_{sf}$, $Z_{sf}$), such as the NED frame. Other implementations of the attitude estimator system 10 use measurements derived from position or velocity to form velocity observations. This is also referred to herein as "forming velocity-derived observations".

The Kalman filter 100 processes the Nav frame velocity observation input from the form observations module 180 by rotating the velocity-derived observation into the sensor frame, performing standard Kalman filter operations, and then zeroing selected gains (to reduce the degradation in the navigation system due to the low performance sensors) before computing the Kalman filter corrections that are provided as Kalman filter feedback to the navigation system 110. As defined herein, zeroing selected gains is zeroing gains associated with at least one of the low performance sensors (i.e., at least one of the third low performance accelerometer 153, the third low performance gyroscope 163, and the second gyroscope 162 if it is a low performance gyroscope 162).

Figure 4A:
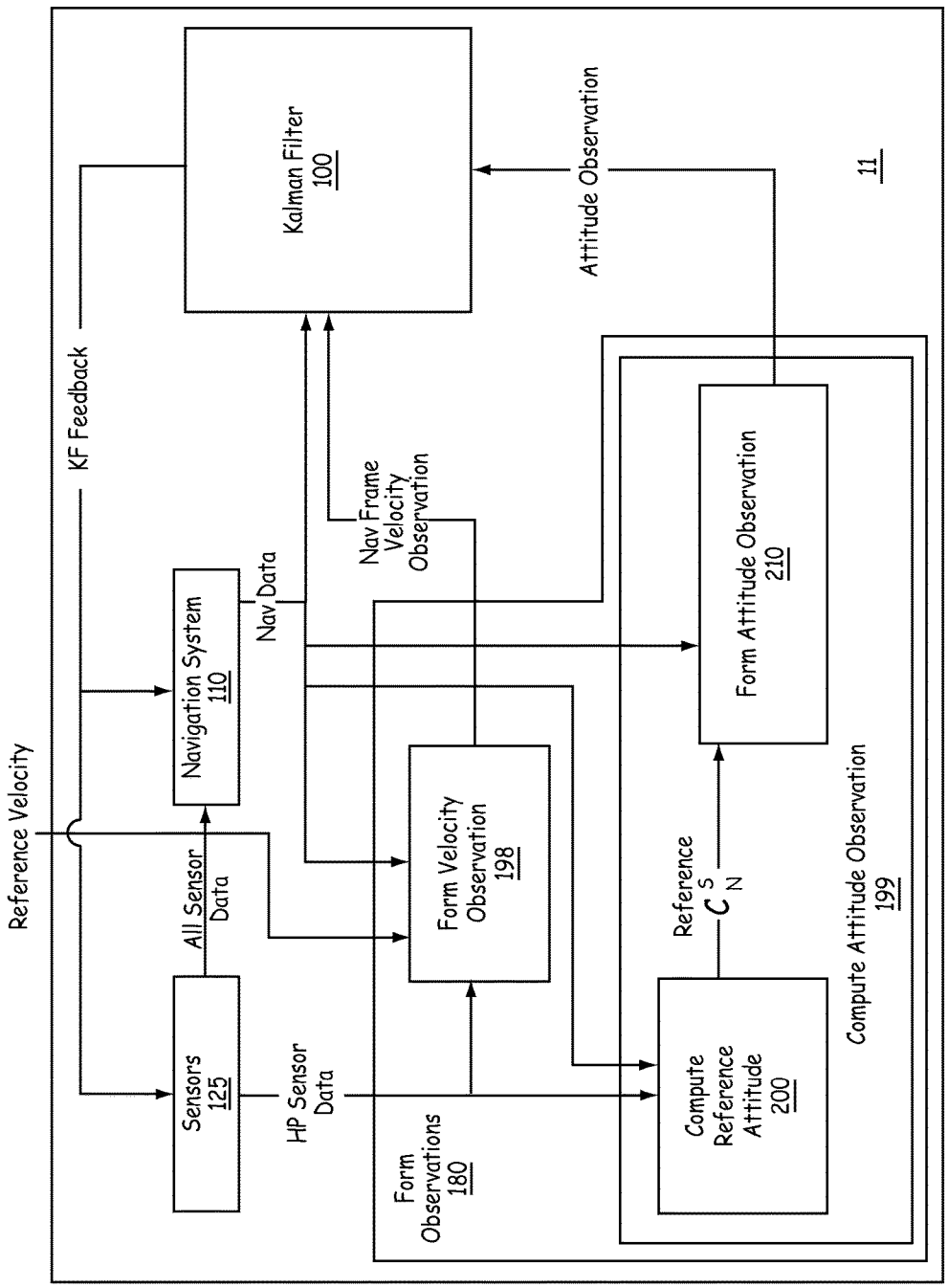
FIG. 4A is a block diagram of an embodiment of an attitude estimator system in accordance with the present invention.
Figure 4B:
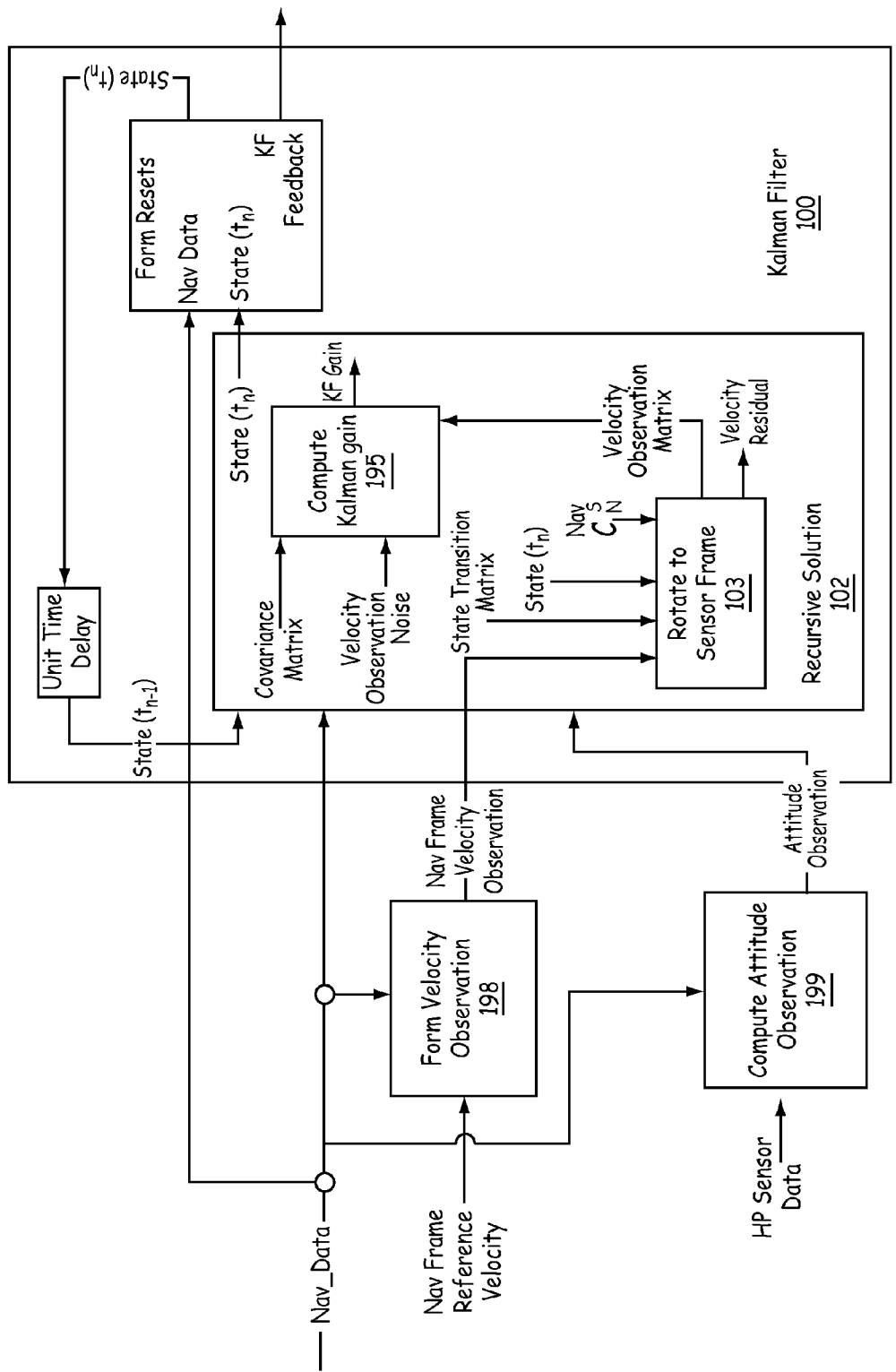
FIG. 4B is an expanded block diagram of the Kalman filter of FIG. 4A.

In yet another implementation of the attitude estimator system 10, the form observations module 180 of FIG. 1 forms both attitude-derived observations and velocity-derived observations and outputs both a velocity observation and an attitude observation to the Kalman filter 100. In this embodiment, which is shown in more detail in FIGS. 4A and 4B, the form observations module 180 includes both a form velocity observation module 198 and a compute attitude observation module 199 (FIGS. 4A and 4B). The velocity observation and attitude observation are input at the Kalman filter 100 from the form observations module 180 and are processed by the Kalman filter 100 to generate Kalman filter corrections (Kalman filter feedback), which are applied to the navigation system 110.

A display 70 communicatively coupled to the processor 55 is optional. In one implementation of this embodiment, the display 70 is communicatively coupled to the attitude estimator system 10 but is not part of the attitude estimator system 10.

In one implementation of this embodiment, the sensors 125 are included in the attitude estimator system 10. In another implementation of this embodiment, the attitude estimator system 10 is a Light Weight North Finder (LWNF) of Honeywell, Inc. modified as described herein so that the Kalman filter 100 processes the measurement by: 1) inputting the velocity-derived observations formed in the form observations module, rotating the velocity-derived observation into a sensor-frame, and zeroing gains associated with at least one of the low performance accelerometer sensors; or 2) inputting the attitude-derived observations (based on output from at least one of the high performance sensors) formed in the form observations module. In this latter embodiment, the LWNF contains the sensors 125, which include one digital ring laser gyro, two high performance accelerometers, and low performance accelerometers and gyroscopes. In one implementation of this embodiment, the digital ring laser gyro is a GG1320 gyro, the high performance accelerometer is a QA-2000 accelerometer, and the low performance accelerometers and gyroscopes are HG1930 tactical grade MEMS-based IMU, all produced by Honeywell, Inc. The gyroscopes and accelerometers, which are used to determine azimuth using gyro-compassing, send changes in velocity and changes in angle to the processor 55 to compute the current attitude (roll, pitch, and heading) of the system. The inertial sensors track attitude while the device is operating and send those signals to the processor 55. The processor 55 determines navigation information, which is the attitude, and, optionally, velocity and position, based on the outputs of the gyroscopes and the accelerometers. The processor 55 executes software/firmware 56 to calculate the new navigation solution when the system moves between the first position of the attitude estimator and the second position. Then the processor 55 outputs the navigation information to a display, which allows the user to see the navigation information, which includes heading. The user may also see other navigation information including whether or not the device is aligned or performing an alignment, and whether or not the unit is functioning correctly.

The processing of the Kalman filter 100, receives information in the nav frame, processes it to remove the effect of the low quality sensors, and then removes the errors modeled by the Kalman filter, associated with the navigation state, the inertial sensors, and the aiding sensors, if any. This is done by rotating the velocity or other similar measurement (e.g., position) into the sensor frame and then zeroing or inactivating specific gains computed by the Kalman 100. The gains that are selected to be zero are dependent on the combination of high quality and low quality gyroscopes and accelerometers. In one implementation, the Kalman filter gain from the axis containing the low performance gyroscope 162 into heading is set to zero. The primary effects of these operations are to improve the ability of the Kalman filter 100 to gyro compass and thus estimate heading. Gyro compassing is the term of the art that refers to the process of the Kalman filter 100 estimating the heading of the attitude estimator system 10 while moving at a constant velocity or while stationary. This also works when the attitude estimator system 10 is changing velocity, if a reference velocity value is available. Of course, the Kalman filter 100 may also process changes in attitude and position change measurements, which are not described herein.

Navigation data derived from the sensors 125 is normally used in the navigation algorithms to compute pitch, roll, and heading. Pitch and roll is the angle between the sensor-frame and the local level or NED frame (normal to gravity vector) and heading is the angle between the X-sensor-frame axis and true north. When the housing 50 is tilted with respect to the local level, the sensor-frame ($X_{sf}$, $Y_{sf}$, $Z_{sf}$) rotates (by pitching and/or rolling) with respect to local level or NED frame, so that the third low performance accelerometer 153 and the third low performance gyroscope 163 are no longer aligned with the force of gravity $F_g$ that is parallel to $Z_{NED}$. The Navigation data may include position and velocity.

Prior art attitude estimator systems do not account for the errors contributed by the third low performance accelerometer 153 and the third low performance gyroscope 163, which are partially aligned with the level axes ($X_{NED}$, $Y_{NED}$) when the housing 50 is tilted. Accelerometer and gyroscope information, in prior art attitude estimator systems, is provided to the Kalman filter in a nav frame, such as NED frame (or local level frame). In the NED frame ($X_{NED}$, $Y_{NED}$, $Z_{NED}$), the $Z_{NED}$ axis is parallel to the gravity vector $F_g$ and the $X_{NED}$ axis and $Y_{NED}$ axes are orthogonally arranged in a plane perpendicular to the $Z_{NED}$ axis. In prior art attitude estimator systems, information sent to the prior art Kalman filter from the sensors includes the sensor data from the Z accelerometer and Z gyroscope, which degrade the estimation of attitude. By rotating navigation frame velocity observation from the form velocity observation 198 into at least one or more axis of the sensor-frame ($X_{sf}$, $Y_{sf}$, $Z_{sf}$) and then zeroing select Kalman filter gains, the sensitivity to one or more of the less accurate accelerometer 153, gyroscope 162, and gyroscope 163 is removed and the overall accuracy of the navigation solution is improved.

In this manner, the attitude estimator system 10 effectively removes the error contribution from the less accurate Z accelerometer and effectively uses only the velocity information derived from the high quality X and Y accelerometers 151 and 152 to aid the Kalman filter 100. Likewise, attitude estimator system 10 effectively removes the error contribution from the less accurate Z-body gyroscope 163 and the Y-body gyroscope 162 by using only the velocity information derived from the high performance X-body gyroscope 161 to aid the Kalman filter 100.

Specifically, the sensitivity to the Z accelerometer 153 is removed so that the Kalman filter 100 does not propagate the errors due to the Z accelerometer 153 into its estimate of the errors in navigation solution. Similarly, the sensitivity to the Z gyroscope 163 and Y gyroscope 162 is removed so that the Kalman filter 100 does not propagate the errors due to the Z gyroscope 163 or Y gyroscope 162 into its estimate of the errors in navigation solution. This is accomplished by rotating the observation in the sensor-frame ($X_{sf}$, $Y_{sf}$, $Z_{sf}$) and then processing it by the Kalman Filter 100 instead of the Kalman filter 100 processing the observation in the NED frame ($X_{NED}$, $Y_{NED}$, $Z_{NED}$). This also allows the Kalman filter 100 to more accurately estimate pitch and roll.

In one implementation of this embodiment, the Y-body gyroscope 162 is a high performance Y-body gyroscope 162, and attitude estimator system 10 does not remove the contribution from the high performance Y-body gyroscope 162. In another implementation of this embodiment, the degradation to the Z-body accelerometer 153 is reduced but the degradation to the Z gyroscope 163 or Y gyroscope 162 is not reduced. In yet another implementation of this embodiment, the degradation to the Z gyroscope 163 is reduced but the degradation to the Z accelerometer 153 or Y gyroscope 162 is not reduced. In another implementation of this embodiment, the degradation to the Y gyroscope 163 is reduced but the sensitivity to the Z accelerometer 153 or Y gyroscope 163 is not reduced.

FIG. 4A is a block diagram of an embodiment of an attitude estimator system 11 in accordance with the present invention. As shown in FIG. 4A, the attitude estimator system 11 includes a navigation system 110, a form observations module 180, a Kalman filter 100, and sensors 150. The form observations module 180 includes a form velocity observation module 198 and a compute attitude observation module 199. The compute attitude observation module 199 includes a compute reference attitude module 200 and a module 210 to form attitude observation 210, which differences the reference data and navigation system data. The compute reference attitude module 200 is also referred to herein as a "reference attitude module 200". The "form velocity observation module 198" is also referred to herein as a "form velocity observation 198".

The navigation system 110 outputs the navigation data (Nay Data) to: the reference attitude module 200; the module 210 to form attitude observation; the form velocity observation 198; and the Kalman filter 100. The navigation data includes a nav-to-sensor-frame direction cosine matrix.

The reference attitude module 200 in the compute attitude observation module 199 inputs sensor data from either the first gyroscope 161 or from the first accelerometer 151 and the second accelerometer 152. The reference attitude module 200 outputs a nav-to-sensor-frame direction cosine matrix (shown as $C_N^S$) to the module 210 to form attitude observation. The nav-to-sensor-frame direction cosine matrix $C_N^S$, is based on sensor data from the first gyroscope 161 or is based on sensor data from the first accelerometer 151 and the second accelerometer 152.

The module 210 to form attitude observation receives the reference direction cosine matrix $C_N^S$, as input from the reference attitude module 200 and receives the navigation direction cosine matrix between the sensor frame ($X_{sf}$, $Y_{sf}$, $Z_{sf}$) and the nav frame as input from the navigation system 110. Based on these received inputs, the module 210 generates the attitude observation to be output to the Kalman filter 100. As defined herein, the attitude observation is an estimate of error in the attitude of the navigation system 110.

The form velocity observation 198 inputs a reference velocity value and receives the navigation data as input from the navigation system 110. The reference velocity equals zero if the system is stationary. The form velocity observation 198 outputs a velocity observation to the Kalman filter 100 in a nav frame. Thus, the velocity observation output from the form velocity observation 198 to the Kalman filter 100 is referred to herein as "navigation frame velocity observation". The form velocity observation 198 computes an observation based on the difference between the reference velocity value and the navigation velocity. The availability of reference data and system design choices determine whether a velocity, a position change, or a position observation and the frame of reference is output from the form velocity observation module 198. Observations formed from velocity, position change, or the position observation and the frame of reference are referred to herein as velocity-derived observations.

The Kalman filter 100 is executed by the processor 55 (FIG. 1) to generate navigation corrections that are output as Kalman filter feedback. The navigation corrections are obtained based on the attitude observation from the compute attitude observation module 199, the navigation frame velocity observation from the form velocity observation 198, and the navigation data from the navigation system 110.

In one implementation of this embodiment, the form velocity observation 198 is not implemented and the form observations module 180 inputs data from the first high performance gyroscope 161, the first high performance accelerometer 151, and the second high performance accelerometer 152. In this embodiment, the compute attitude observation module 199 computes the reference attitude using the data from these high performance sensors. This reference attitude is differenced with the navigation attitude input from the navigation system 110 to compute the attitude observation. The Kalman filter 100 processes the attitude observation input from the compute attitude observation module 199 and updates the attitude estimate of the navigation system 100. This implementation reduces the degradation due to the third low performance accelerometer 153, the second low performance gyroscope 162 and the third low performance gyroscope 163.

FIG. 4B is an expanded block diagram of the Kalman filter of FIG. 4A. FIG. 4B shows a block diagram of a recursive solution module 102 of the Kalman filter 100. Navigation data is input from the navigation system 110 (FIG. 4A) to the recursive solution module 102 in the Kalman filter 100. The recursive solution module 102 includes a module 103 to rotate the error into the sensor-frame ($X_{sf}$, $Y_{sf}$, $Z_{sf}$) and a compute Kalman gain module 195. The module 103 inputs navigation frame velocity observation from the form velocity observation 198 and the attitude observation from the compute attitude observation module 199. The module 103 outputs a velocity observation matrix and velocity residual to the Kalman filter 100.

Figure 5:
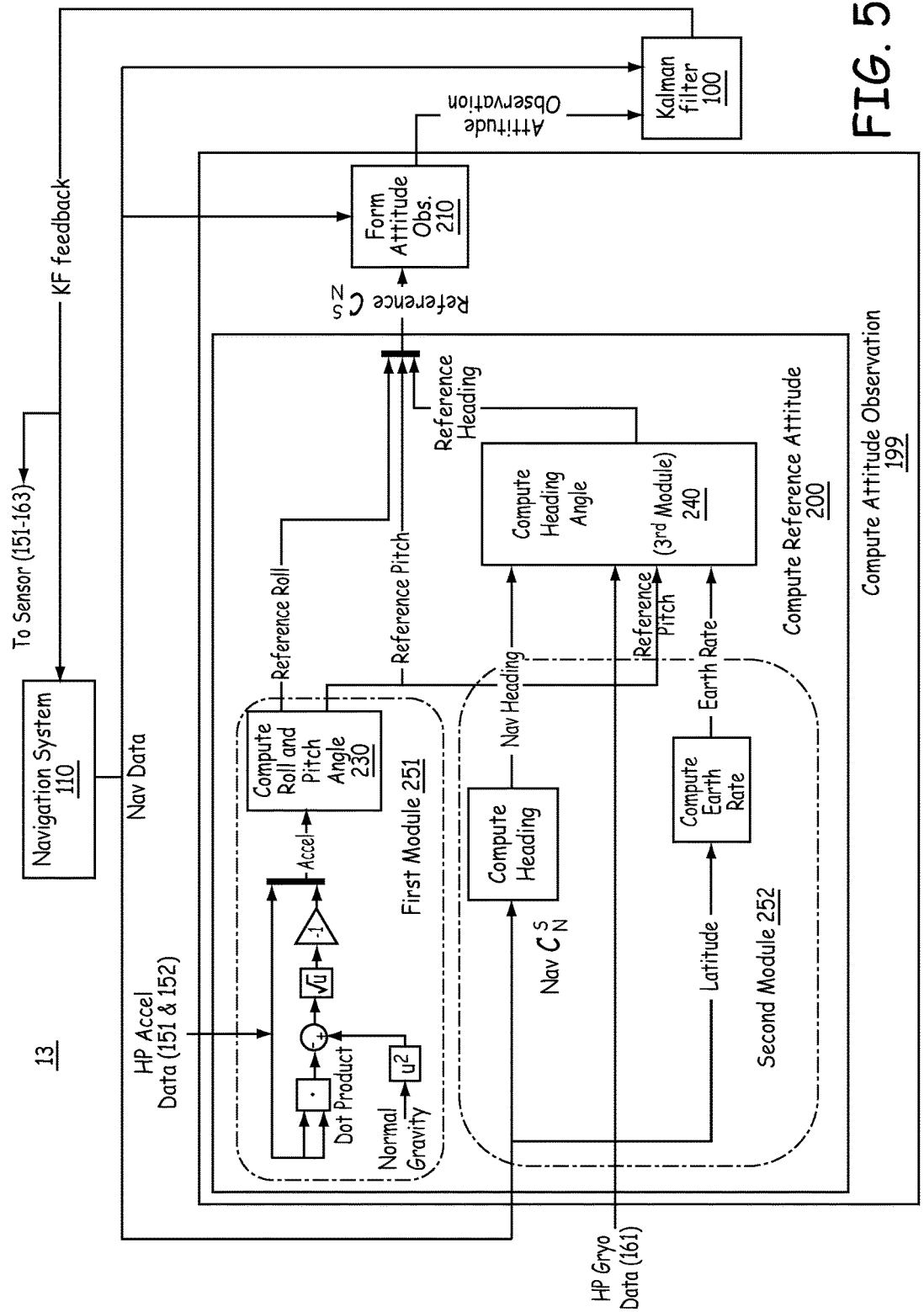
FIG. 5 is an expanded block diagram of an embodiment of the compute reference attitude module in the attitude estimator of FIG. 4A.

FIG. 5 is an expanded block diagram 13 of the compute reference attitude module 199 in the attitude estimator 11 of FIG. 4A. The compute attitude observation module 199 includes the compute reference attitude module 200 and the form attitude observations module 210 (also referred to herein as module 210 to form attitude observations). The compute reference attitude module 200 in FIG. 5 computes the reference data $C_N^S$, which is output to the form attitude observations module 210 as described above with reference to FIG. 4A.

The compute reference attitude module 200 includes a first module 251, a second module 252, and a third module 240. The first module 251 determines the reference level attitude based on data from the high performance accelerometers 151 and 152 (e.g., high accuracy acceleration data). The first module 251 includes a module 230 to compute reference roll and reference pitch based on the high accuracy acceleration data. The module 230 outputs the reference roll and the reference pitch to the form attitude observations module 210. The module 230 also outputs the reference pitch to the third module 240.

The second module 252 computes the navigation heading based on the on the navigation data from the navigation system 110. The second module 252 includes a module to compute earth rate. The second module 252 outputs the computed navigation heading, the earth rate, and the high accuracy gyro data to the third module 240.

The third module 240 computes a reference heading based on: the reference pitch input from the first module 251; the navigation heading from the second module 252, the earth rate input from the second module 252, and the high accuracy gyro data from the high performance gyroscope 161 (or high performance gyroscopes 161 and 162). The reference heading computed by the third module 240 is input along with the reference roll and reference pitch from the first module 251 (as reference data $C_N^S$) to the form attitude observations module 210.

The form attitude observations module 210 differences the reference attitude and the navigation attitude to form an observation. This observation will be used in the Kalman filter to estimate and correct the navigation system for errors. In one implementation of this embodiment, the form attitude observations module 210 differences the reference direction cosine matrix and the navigation system direction cosine matrix. The form attitude observations module 210 outputs an attitude observation to the Kalman filter 100. The attitude observation is independent of sensor data from the low performance accelerometer 153 and the low performance gyroscopes 162 and 163. The Kalman filter 100 receives the navigation data from the navigation system 110. The Kalman filter 100 generates corrections that are sent to the navigation system 110 and to the sensor compensation module 145 (FIG. 2) as Kalman filter feedback.

Figure 6A:
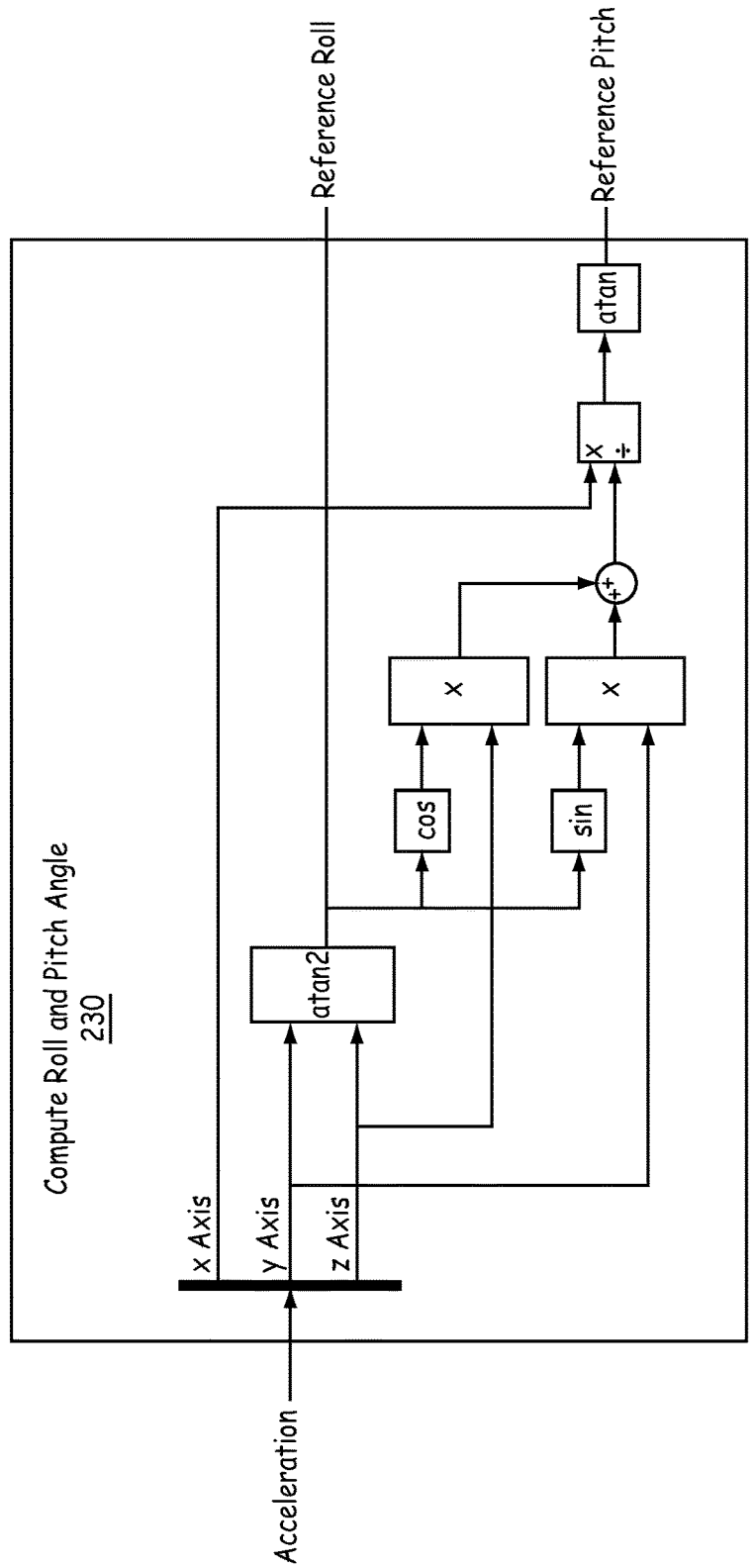
FIG. 6A is a block diagram of a module to compute roll and pitch angle shown in FIG. 5.

FIG. 6A is a block diagram of a module 230 to compute roll and pitch angle shown in FIG. 5. High accuracy accelerometer data is input to the module 230. The reference roll and reference pitch are output from the module 230.

Figure 6B:
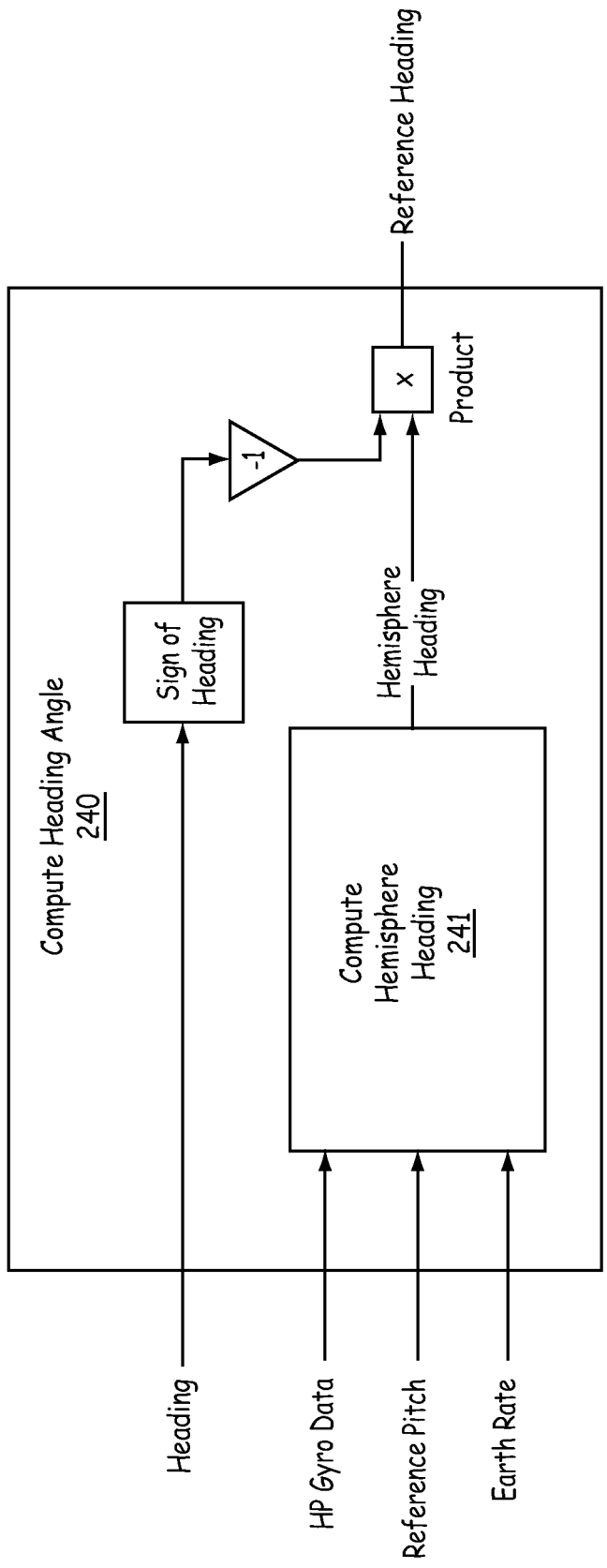
FIG. 6B is a block diagram of a third module to compute heading angle shown in FIG. 5.
Figure 7:
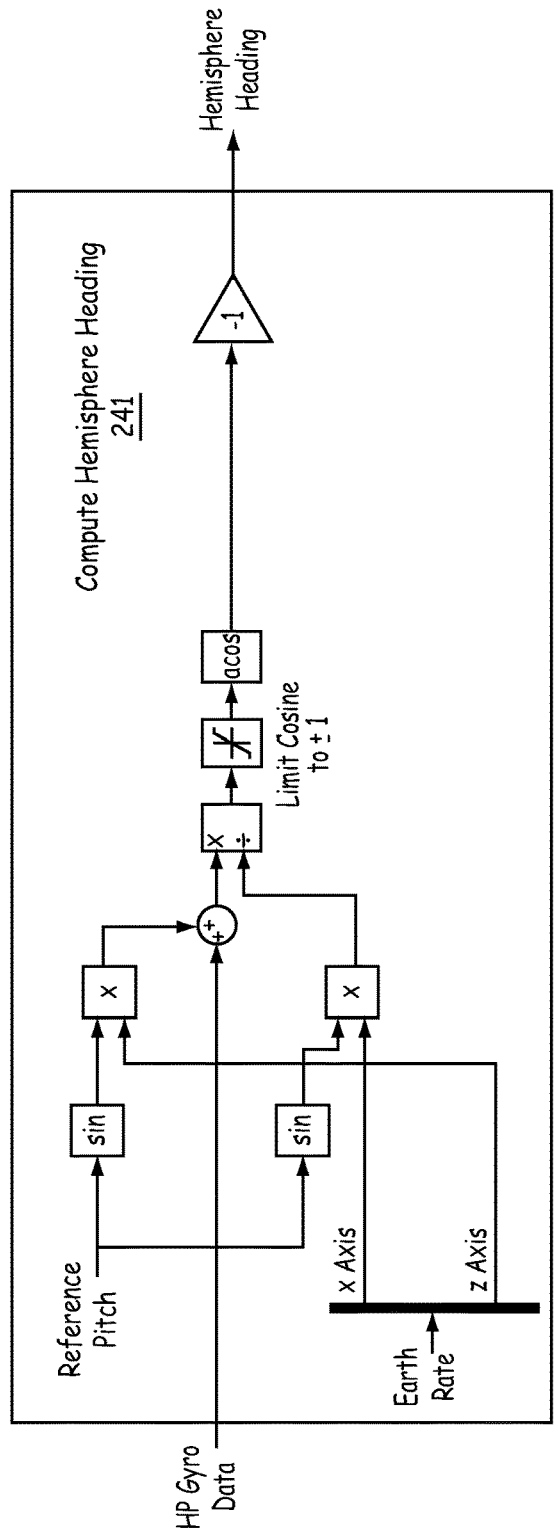
FIG. 7 is an expanded block diagram of a module to compute hemispheric heading angle shown in FIG. 6B.

FIG. 6B is a block diagram of a third module 240 to compute heading angle shown in FIG. 5. The attitude (heading), high accuracy gyroscope data, reference pitch, and earth rate are input to the module 240. The reference heading is output from the module 240. The module 240 includes a module 241 to compute hemispheric heading angle. Hemispheric heading is a two quadrant heading. The high accuracy gyroscope data, reference pitch, and earth rate are input to the module 241 to compute hemispheric heading angle. FIG. 7 is an expanded block diagram of a module 241 to compute hemispheric heading angle shown in FIG. 6B.

Figure 8A:
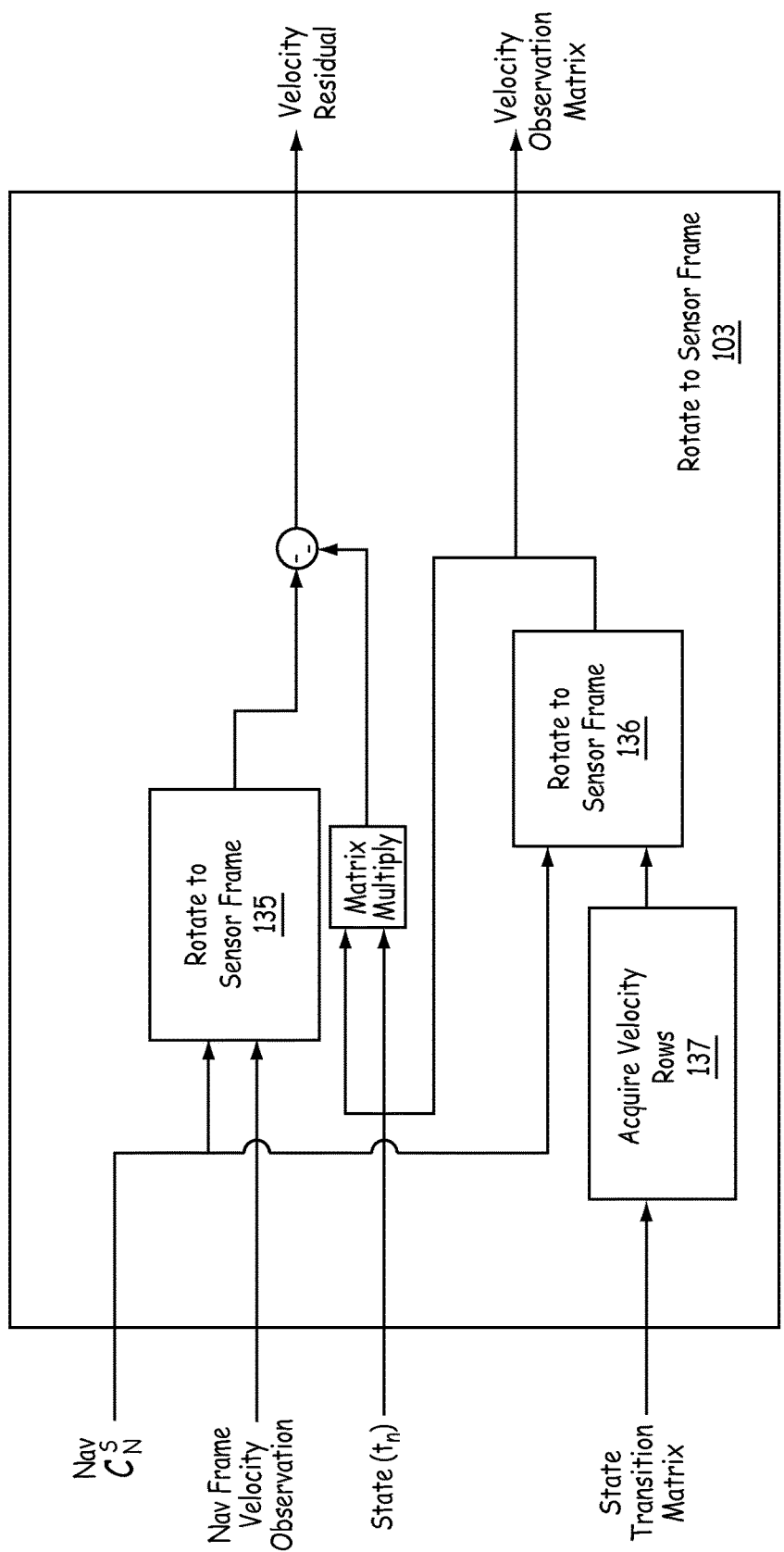
FIG. 8A is a block diagram of an embodiment of a rotate to sensor-frame module shown in FIG. 4B.

FIG. 8A is a block diagram of an embodiment of a module 103 to rotate the error into the sensor-frame ($X_{sf}$, $Y_{sf}$, $Z_{sf}$) shown in FIG. 4B. The module 103 to rotate the error into the sensor-frame in the Kalman filter 100 rotates the velocity observation from the nav frame into the sensor frame ($X_{sf}$, $Y_{sf}$, $Z_{sf}$). In addition, the rows associated with the velocity states from the state transition matrix are rotated to sensor frame by module 136. The rows containing the velocity states are acquired by the module 137 from the state transition matrix. The module 103 to rotate observation to the sensor-frame ($X_{sf}$, $Y_{sf}$, $Z_{sf}$) outputs a velocity observation matrix and velocity residual (velocity observation noise).

Figure 8B:
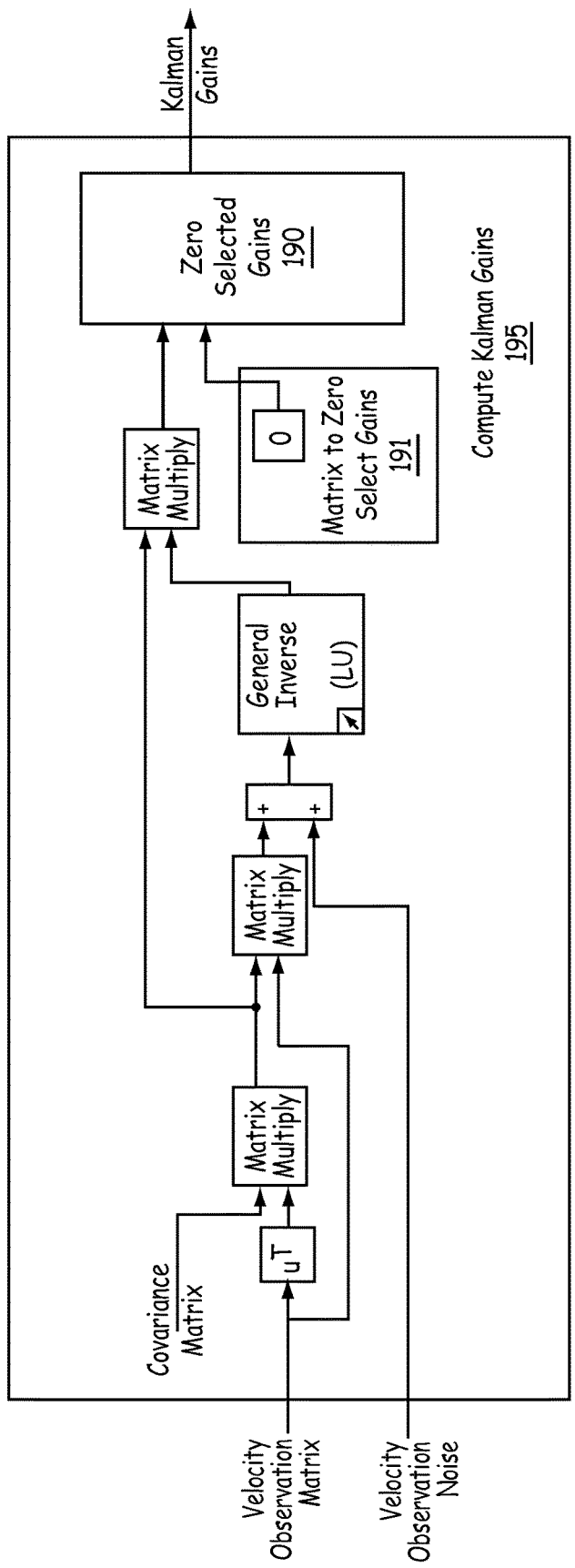
FIG. 8B is an expanded block diagram of an embodiment of a compute Kalman gains module shown in FIG. 4B.

FIG. 8B is an expanded block diagram of an embodiment of a compute Kalman gains module 195 shown in FIG. 4B. The compute Kalman gains module 195 includes a module 190 to zero selected gains and a module 191 to select the gains to set to zero. The compute Kalman gains module 195 inputs the velocity observation noise and the velocity observation matrix that was output from the module 103 to rotate the error into the sensor-frame. The selected gains are zeroed by the module 190 to reduce the effect of the sensors that are not co-linear with of the high quality gyroscope 161 or when processing measurements that are not co-linear with the high quality accelerometers 151 or 152. Kalman gains are output from the module 190 for processing by the Kalman filter 100.

Figure 9:
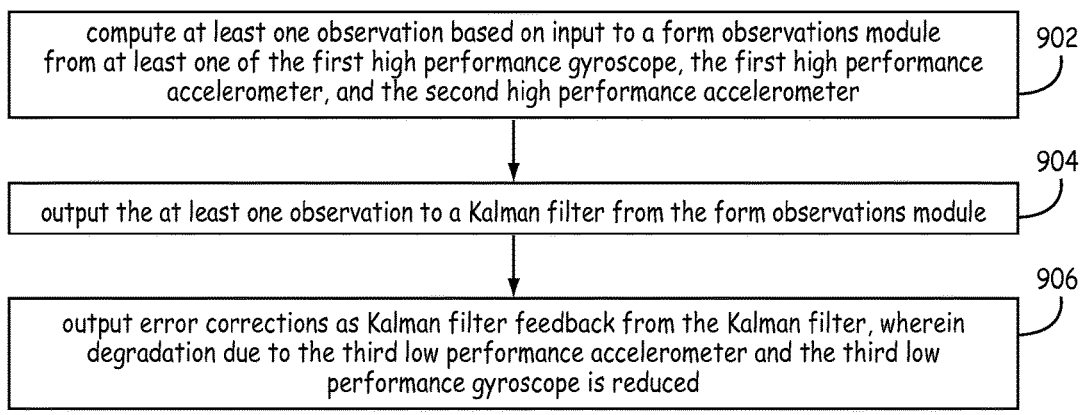
FIG. 9 is a flow diagram of one embodiment of a method to improve performance in a navigation system in accordance with the present invention.

FIG. 9 is a flow diagram of one embodiment of a method 900 to improve performance in a navigation system 110 in accordance with the present invention. The navigation system 110 is communicatively coupled to a first high performance accelerometer 151 and a first high performance gyroscope 161 aligned to a first sensor-frame-level axis ($X_{sf}$), a second high performance accelerometer 152 and a second gyroscope 162 aligned to a second sensor-frame-level axis ($Y_{sf}$), a third low performance accelerometer 153 and a third low performance gyroscope 163 aligned to a third sensor frame axis ($Z_{sf}$). At block 902, at least one observation is computed based on input to a form observations module 180 from at least one of the first high performance gyroscope 161, the first high performance accelerometer 151, and the second high performance accelerometer 152. The computing of the observation is based on a difference between at least one reference value and at least one associated navigation value input from the navigation system to the form observations module. The at least one reference value includes at least one of a reference velocity value, a reference position change, a reference position value, a reference heading value, a reference pitch value, and a reference roll value, any one or more of which are used to form velocity-derived observations. For example, if the reference value is a reference heading, the associated navigation value is a navigation heading; if the reference value is a reference velocity, the associated navigation value is a navigation value. In one implementation of block 902, the at least one observation is computed based on input to a form observations module 180 from at least one high performance sensor including a second high performance gyroscope 162.

At block 904, the at least one observation is output to a Kalman filter 100 from the form observations module 180.

At block 906, error corrections are output as Kalman filter feedback from the Kalman filter 100 so that the degradation due to the third low performance accelerometer 153, the second low performance gyroscope 162, and the third low performance gyroscope 163 is reduced. The degradation due to the third low performance accelerometer 153, the second low performance gyroscope 162, and the third low performance gyroscope 163 is reduced by at least one of rotating errors into a sensor-frame and/or zeroing gains from at least one of the third low performance accelerometer, the second low performance gyroscope, or the third low performance gyroscope. In one implementation of block 906, error corrections are output as Kalman filter feedback from the Kalman filter 100 to reduce degradation due to low sensors including a second low performance gyroscope 162.

In one implementation of this embodiment, the form observations module 180 includes a compute attitude observation module 199 that improves performance because only the high accuracy sensors are used in forming the attitude observation. The compute attitude observation module 199 includes a compute reference attitude module 200 and a module 210 to form attitude observation (FIGS. 4A and 4B). In this case, computing the at least one observation based on input to a form observations module 180 includes computing a reference attitude direction cosine matrix ($C_N^S$) at the compute reference attitude module 200 based on data from at least one of the first high performance accelerometer 151, the first high performance gyroscope 161, and the second high performance accelerometer 152 and a second gyroscope 162 if it is a high performance gyroscope 162; inputting the reference attitude direction cosine matrix at the module 210 to form attitude observation in the form observations module 180; and computing at least one observation at the module 210 to form attitude observation. The attitude observation is sent to the Kalman filter.

In another implementation of this embodiment, the form observations module 180 also includes a form velocity observation module 198 (FIGS. 4A and 4B). In this case, computing the at least one observation based on input to the form observations module 180 further includes computing the at least one observation at the form velocity observation module 198. Then method 900 also includes differencing a navigation velocity from the navigation system 110 and a reference velocity value and outputting a velocity observation to the Kalman filter 100 from the form observations module 198.

In yet another implementation of this embodiment, the form observations module 180 only includes a form velocity observation module 198. In this case, computing the at least one observation based on input to a form observations module 180 includes computing the at least one observation at the form velocity observation module 198. Then method 900 includes differencing a navigation velocity from the navigation system 110 and a reference velocity value, and outputting a velocity observation to the Kalman filter 100 from the form observations module 198.

In yet another implementation of this embodiment, the form observations module 180 is a compute attitude observation module 199 that includes a first module 251, a second module 252, and a third module 240 (FIG. 5). In this case, the method 900 includes computing a reference roll value and a reference pitch value based on input to the first module 251 from the first high performance accelerometer 151 and the second high performance accelerometer 152; and computing a reference attitude value based on input to the second module 252 from the first high performance gyroscope 161. The method 900 also includes outputting a reference heading value from the third module 240; and differencing a navigation heading from the navigation system 110 and the reference heading value from the third module 240 at the form attitude observations module 210. The at least one observation is output to the Kalman filter by outputting an attitude observation from the form attitude observations module 210 to the Kalman filter 100.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory.

Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes an attitude estimator system, comprising a navigation system to output navigation data; a Kalman filter to output Kalman filter feedback to the navigation system; and a form observations module executable by a processor, wherein the navigation system receives input from a first high performance accelerometer and a first high performance gyroscope aligned to a first sensor-frame-level axis, from a second high performance accelerometer and a second gyroscope aligned to a second sensor-frame-level axis, and from a third low performance accelerometer and a third low performance gyroscope aligned to a sensor-frame Z axis, wherein the form observations module: receives input from at least one of the first high performance accelerometer, the first high performance gyroscope, and the second high performance accelerometer, forms at least one of velocity-derived observations and attitude-derived observations, and outputs the at least one of velocity-derived observations and attitude-derived observations to the Kalman filter, and wherein the Kalman filter processes the input from the form observations module by at least one of: inputting the velocity-derived observations formed in the form observations module, rotating the velocity-derived observation into a sensor-frame, and zeroing gains associated with at least one of the third low performance accelerometer, and the third low performance gyroscope; and inputting the attitude-derived observations formed in the form observations module, the attitude-derived observations being based on output from at least one of the first high performance accelerometer, the first high performance gyroscope, and the second high performance accelerometer.

In Example 2, the attitude estimator system of Example 1 can optionally comprise wherein the second gyroscope aligned to the second sensor-frame-level axis is a second high performance gyroscope, and wherein the form observations module receives input from at least one of the first high performance accelerometer, the first high performance gyroscope, the second high performance accelerometer, and the second high performance gyroscope.

In Example 3, the attitude estimator system of Example 1 can optionally comprise wherein the second gyroscope aligned to the second sensor-frame-level axis is a second low performance gyroscope, and wherein the Kalman filter processes the input from the form observations module by zeroing gains associated with least one of the third low performance accelerometer, the second low performance gyroscope, and the third low performance gyroscope.

In Example 4, the attitude estimator system of any of Examples 1-3 can optionally comprise: the first high performance accelerometer; the first high performance gyroscope; the second high performance accelerometer; the second gyroscope; the third low performance accelerometer; the third low performance gyroscope; and a sensor compensator, wherein the first high performance accelerometer, the first high performance gyroscope, the second high performance accelerometer, the second gyroscope, the third low performance accelerometer, and the third low performance gyroscope are communicatively coupled to output data to the sensor compensator, wherein the sensor compensator inputs the Kalman filter feedback from the Kalman filter and outputs compensated sensor data based on the Kalman filter feedback.

In Example 5, the attitude estimator system of any of Examples 1-4 can optionally comprise: wherein the form observations module comprises; a form observations module to input a reference value, to difference the reference value and a navigation input from the navigation system, and to output an observation to the Kalman filter based on the difference between the reference value and the navigation input.

In Example 6, the attitude estimator system of any of Examples 1-5 can optionally comprise: wherein the Kalman filter includes: a module to rotate an error into the sensor-frame; and a compute Kalman gains module to zero selected gains.

In Example 7, the attitude estimator system of any of Examples 1-6 can optionally comprise: wherein the form observations module includes: a compute attitude observation module; and a form observations module, wherein the compute attitude observation module includes: a first module to compute a reference roll and a reference pitch based on data from the first high performance accelerometer and the second high performance accelerometer; a second module to determine a navigation heading based on the navigation data; and a third module to compute a reference heading value based on: the reference pitch input from the first module; the navigation heading input from the second module; an earth rate input from the second module; and high accuracy gyro data from the first high performance gyroscope.

In Example 8, the attitude estimator system of Example 7 can optionally comprise: wherein the form observations module takes a difference between a navigation heading from the navigation system and the reference heading value from the third module and outputs an attitude observation to the Kalman filter.

In Example 9, the attitude estimator system of Example 1 can optionally comprise: a compute velocity observation to input the navigation data from the navigation system, to input a reference velocity, and to form a navigation frame velocity observation, and a compute attitude observation module including: a compute reference attitude module to input sensor data from the first gyroscope and to output reference data, and a module to form attitude observations, the module configured to difference the reference data and the navigation data, and to output an attitude observation to the Kalman filter.

In Example 10, the attitude estimator system of any of Examples 1-9 can optionally comprise the processor to execute the Kalman filter.

Example 11 includes a method to improve performance of a navigation system communicatively coupled to a first high performance accelerometer and a first high performance gyroscope aligned to a first sensor-frame-level axis, a second high performance accelerometer and a second gyroscope aligned to a second sensor-frame-level axis, and a third low performance accelerometer and a third low performance gyroscope aligned to a third sensor frame axis, the method comprising: computing at least one observation based on input to a form observations module from at least one of the first high performance gyroscope, the first high performance accelerometer, and the second high performance accelerometer, outputting error corrections as Kalman filter feedback from the Kalman filter wherein degradation of the navigation system due to the third low performance accelerometer, and the third low performance gyroscope is reduced.

Example 12 includes a method to improve performance of a navigation system communicatively coupled to a first high performance accelerometer and a first high performance gyroscope aligned to a first sensor-frame-level axis, a second high performance accelerometer and a second high performance gyroscope aligned to a second sensor-frame-level axis, and a third low performance accelerometer and a third low performance gyroscope aligned to a third sensor frame axis, the method comprising: computing at least one observation based on input to a form observations module from at least one of the first high performance gyroscope, the first high performance accelerometer, the second high performance accelerometer, and the second high performance gyroscope, outputting error corrections as Kalman filter feedback from the Kalman filter wherein degradation of the navigation system due to the third low performance accelerometer, and the third low performance gyroscope is reduced.

Example 13 includes a method to improve performance of a navigation system communicatively coupled to a first high performance accelerometer and a first high performance gyroscope aligned to a first sensor-frame-level axis, a second high performance accelerometer and a second low performance gyroscope aligned to a second sensor-frame-level axis, and a third low performance accelerometer and a third low performance gyroscope aligned to a third sensor frame axis, the method comprising: computing at least one observation based on input to a form observations module from at least one of the first high performance gyroscope, the first high performance accelerometer, and the second high performance accelerometer, outputting error corrections as Kalman filter feedback from the Kalman filter wherein degradation of the navigation system due to at least one of the third low performance accelerometer, the second low performance gyroscope, and the third low performance gyroscope is reduced.

In Example 14, the method of Examples 11-13 can optionally comprise: wherein the form observations module includes a compute reference attitude module and a module to form attitude observation, wherein computing the at least one observation based on input to the form observations module comprises: computing a reference attitude direction cosine matrix at the compute reference attitude module based on data from at least one of the first high performance accelerometer, the first high performance, and the second high performance accelerometer; inputting the reference attitude direction cosine matrix at the module to form attitude observation in the form observations module; and computing an attitude observation at the module to form attitude observation, and wherein outputting at least one observation to the Kalman filter comprises: outputting the attitude observation to the Kalman filter from the module to form attitude observation.

In Example 15, the method of any of Examples 11-14 can optionally comprise: wherein the form observations module further includes a compute velocity observation module, wherein the computing the at least one observation further comprises: differencing a navigation velocity from the navigation system and a reference velocity value, and wherein outputting at least one observation to the Kalman filter further comprises: outputting a velocity observation to the Kalman filter from the compute velocity observation module.

In Example 16, the method of Examples 11-13 can optionally comprise: wherein the form observations module includes a compute velocity observation module, wherein the computing the at least one observation based on input to a form observations module comprises: differencing a navigation velocity from the navigation system and a reference velocity value, and wherein outputting at least one observation to the Kalman filter comprises: outputting a velocity observation to the Kalman filter from the compute velocity observation module.

In Example 17, the method of Examples 11-13 can optionally comprise: wherein the form observations module is a compute attitude observation module comprising a first module, a second module, and a third module, the method further comprising: computing a reference roll value and a reference pitch value based on input to the first module from the first high performance accelerometer and the second high performance accelerometer; computing a reference attitude value based on input to the second module from the first high performance gyroscope; outputting a reference heading value from the third module; and differencing a navigation heading from the navigation system and the reference heading value from the third module at a form observations module, wherein outputting the at least one observation to the Kalman filter comprises: outputting an attitude observation from the form observations module to the Kalman filter.

Example 18 includes a program product for improving performance of a navigation system communicatively coupled to a first high performance accelerometer and a first high performance gyroscope aligned to a first body-frame-level axis, a second high performance accelerometer and a second gyroscope aligned to a second body-frame-level axis, a third low performance accelerometer and a third low performance gyroscope aligned to a third body-frame axis, the program-product comprising a processor-readable medium on which program instructions are embodied, wherein the program instructions are operable, when executed by at least one processor included in an attitude estimator system communicatively coupled to the navigation system, to cause the attitude estimator system to: compute at least one observation based on input to a form observations module from at least one of the first high performance gyroscope, the first high performance accelerometer, and the second high performance accelerometer; output the at least one observation to a Kalman filter from the form observations module; and output error corrections as Kalman filter feedback from the Kalman filter.

In Example 19, the program product of Example 18 can optionally comprise: wherein the form observations module includes a compute reference attitude module and a module to form attitude observation, wherein the program instructions are further operable, when executed by the at least one processor included in the attitude estimator system communicatively coupled to the navigation system, to cause the attitude estimator system to: compute a reference attitude direction cosine matrix at the compute reference attitude module based on data from at least one of the first high performance accelerometer, the first high performance, and the second high performance accelerometer; input the reference attitude direction cosine matrix at the module to form attitude observation in the form observations module; and compute an attitude observation at the module to form attitude observation.

In Example 20, the program product of any of Examples 18 and 19 can optionally comprise: the form observations module further includes a compute velocity observation module, wherein the program instructions are further operable, when executed by the at least one processor included in the attitude estimator system communicatively coupled to the navigation system, to cause the attitude estimator system to: difference a navigation velocity from the navigation system and a reference velocity value, wherein the outputting the at least one observation to the Kalman filter comprises: output a velocity observation to the Kalman filter from the compute velocity observation module.

In Example 21, the program product of Example 18 can optionally comprise: wherein the form observations module includes a compute velocity observation module, wherein the program instructions are further operable, when executed by the at least one processor included in the attitude estimator system communicatively coupled to the navigation system, to cause the attitude estimator system to: difference a navigation velocity from the navigation system and a reference velocity value, wherein outputting at least one observation to the Kalman filter comprises: output a velocity observation to the Kalman filter from the compute velocity observation module.

In Example 22, the program product of Example 18 can optionally comprise: wherein the form observations module is a compute attitude observation module comprising a first module, a second module, and a third module, wherein the program instructions are further operable, when executed by the at least one processor included in the attitude estimator system communicatively coupled to the navigation system, to cause the attitude estimator system to: compute a reference roll value and a reference pitch value based on input to the first module from the first high performance accelerometer and the second high performance accelerometer; compute a reference attitude value based on input to the second module from the first high performance gyroscope; output a reference heading value from the third module; and difference a navigation heading from the navigation system and the reference heading value from the third module at a form observations module, wherein outputting the at least one observation to the Kalman filter comprises: output an attitude observation from the form observations module to the Kalman filter.

Although specific embodiments have been illustrated and described herein, it is appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method to improve performance of a navigation system communicatively coupled to a first high performance accelerometer and a first high performance gyroscope aligned to a first sensor-frame-level axis, a second high performance accelerometer and a second gyroscope aligned to a second sensor-frame-level axis, and a third low performance accelerometer and a third low performance gyroscope aligned to a third sensor frame axis, the method comprising:
computing at least one observation based on input to a form observations module from at least one of the first high performance gyroscope, the first high performance accelerometer, and the second high performance accelerometer;
outputting the at least one observation to a Kalman filter from the form observations module; inputting observations formed in the form observations module at a module in the Kalman filter to rotate an error into a sensor-frame;
rotating the observation into the sensor-frame;
zeroing selected gains associated with at least one of the third low performance accelerometer and the third low performance gyroscope at a compute Kalman gains module in the Kalman filter; and
outputting error corrections as Kalman filter feedback from the Kalman filter to the navigation system, wherein the navigation system updates a navigation solution based on the Kalman filter feedback.

2. The method of claim 1, wherein the form observations module includes a compute reference attitude module and a module to form attitude observation, wherein computing the at least one observation based on input to the form observations module comprises:
computing a reference attitude direction cosine matrix at the compute reference attitude module based on data from at least one of the first high performance accelerometer, the first high performance gyroscope, and the second high performance accelerometer;
inputting the reference attitude direction cosine matrix at the module to form attitude observation in the form observations module; and
computing an attitude observation at the module to form attitude observation, and wherein outputting at least one observation to the Kalman filter comprises:
outputting the attitude observation to the Kalman filter from the module to form attitude observation.

3. The method of claim 2, wherein the form observations module further includes a compute velocity observation module, wherein the computing the at least one observation further comprises:
differencing a navigation velocity from the navigation system and a reference velocity value, and wherein outputting at least one observation to the Kalman filter further comprises:
outputting a velocity observation to the Kalman filter from the compute velocity observation module.

4. The method of claim 1, wherein the form observations module includes a compute velocity observation module, wherein the computing the at least one observation based on input to a form observations module comprises:
differencing a navigation velocity from the navigation system and a reference velocity value, and wherein outputting at least one observation to the Kalman filter comprises:
outputting a velocity observation to the Kalman filter from the compute velocity observation module.

5. The method of claim 1, wherein the form observations module is a compute attitude observation module comprising a first module, a second module, and a third module, the method further comprising:
computing a reference roll value and a reference pitch value based on input to the first module from the first high performance accelerometer and the second high performance accelerometer;
computing a reference attitude value based on input to the second module from the first high performance gyroscope;
outputting a reference heading value from the third module; and
differencing a navigation heading from the navigation system and the reference heading value from the third module at a form observations module, wherein outputting the at least one observation to the Kalman filter comprises:

outputting an attitude observation from the form observations module to the Kalman filter.

6. A program product for improving performance of a navigation system communicatively coupled to a first high performance accelerometer and a first high performance gyroscope aligned to a first body-frame-level axis, a second high performance accelerometer and a second gyroscope aligned to a second body-frame-level axis, a third low performance accelerometer and a third low performance gyroscope aligned to a third body-frame axis, the program-product comprising a non-transitory processor-readable medium on which program instructions are embodied, wherein the program instructions are operable, when executed by at least one processor included in an attitude estimator system communicatively coupled to the navigation system, to cause the attitude estimator system to:

compute at least one observation based on input to a form observations module from at least one of the first high performance gyroscope, the first high performance accelerometer, and the second high performance accelerometer;

output the at least one observation to a Kalman filter from the form observations module; input observations formed in the form observations module at a module in the Kalman filter to rotate an error into a sensor-frame;

rotate the observation into the sensor-frame;

zero selected gains associated with at least one of the third low performance accelerometer and the third low performance gyroscope at a compute Kalman gains module in the Kalman filter; and output error corrections as Kalman filter feedback from the Kalman filter to the navigation system, wherein the navigation system updates a navigation solution based on the Kalman filter feedback.

7. The program product of claim 6, wherein the form observations module includes a compute reference attitude module and a module to form attitude observation, wherein the program instructions are further operable, when executed by the at least one processor included in the attitude estimator system communicatively coupled to the navigation system, to cause the attitude estimator system to:

compute a reference attitude direction cosine matrix at the compute reference attitude module based on data from at least one of the first high performance accelerometer, the first high performance gyroscope, and the second high performance accelerometer;

input the reference attitude direction cosine matrix at the module to form attitude observation in the form observations module; and compute an attitude observation at the module to form attitude observation.

8. The program product of claim 7, wherein the form observations module further includes a compute velocity observation module, wherein the program instructions are further operable, when executed by the at least one processor included in the attitude estimator system communicatively coupled to the navigation system, to cause the attitude estimator system to:

difference a navigation velocity from the navigation system and a reference velocity value, wherein the outputting the at least one observation to the Kalman filter comprises:

output a velocity observation to the Kalman filter from the compute velocity observation module.

9. The program product of claim 6, wherein the form observations module includes a compute velocity observation module, wherein the program instructions are further operable, when executed by the at least one processor included in the attitude estimator system communicatively coupled to the navigation system, to cause the attitude estimator system to:

difference a navigation velocity from the navigation system and a reference velocity value, wherein outputting at least one observation to the Kalman filter comprises:

output a velocity observation to the Kalman filter from the compute velocity observation module.

10. The program product of claim 6, wherein the form observations module is a compute attitude observation module comprising a first module, a second module, and a third module, wherein the program instructions are further operable, when executed by the at least one processor included in the attitude estimator system communicatively coupled to the navigation system, to cause the attitude estimator system to:

compute a reference roll value and a reference pitch value based on input to the first module from the first high performance accelerometer and the second high performance accelerometer;

compute a reference attitude value based on input to the second module from the first high performance gyroscope;

output a reference heading value from the third module; and difference a navigation heading from the navigation system and the reference heading value from the third module at a form observations module, wherein outputting the at least one observation to the Kalman filter comprises:

output an attitude observation from the form observations module to the Kalman filter.

* * * * *